United States Patent [19]

Brown et al.

[11] 4,274,834

[45] Jun. 23, 1981

[54] PROCESS FOR PURIFICATION OF LITHIUM CHLORIDE

[75] Inventors: Patrick M. Brown, Exton; Susan R. Jacob, Royersford, both of Pa.

[73] Assignee: Foote Mineral Company, Exton, Pa.

[21] Appl. No.: 28,974

[22] Filed: Apr. 11, 1979

[51] Int. Cl.$^3$ .................... C01D 3/08; C01D 15/02
[52] U.S. Cl. ..................... 23/302 R; 423/179.5; 423/499
[58] Field of Search ................... 23/299, 302 R; 423/179.5, 499, 658.5

[56] References Cited

U.S. PATENT DOCUMENTS

| | | |
|---|---|---|
| 2,561,439 | 7/1951 | Erasmus . |
| 2,726,138 | 12/1955 | Cunningham . |
| 3,268,290 | 8/1966 | Gaska et al. . |
| 3,278,260 | 10/1966 | Hermann . |
| 3,537,813 | 11/1970 | Nelli et al. . |

*Primary Examiner*—Bradley Garris
*Attorney, Agent, or Firm*—Howson and Howson

[57] ABSTRACT

Lithium chloride containing small amounts of inorganic and/or organic impurities is purified by heating the lithium chloride above about 200° C., cooling the compound to ambient temperatures and extracting it with isopropanol, separating the liquid and solid phases, removing the isopropanol and recovering lithium chloride of high purity.

3 Claims, 2 Drawing Figures

PROCESS FOR PURIFICATION OF LITHIUM CHLORIDE

BACKGROUND OF THE INVENTION

Lithium metal has many uses and, to name a few, they include nuclear power application where a blanket of the liquid metal or its molten salts is used for breeding purposes in nuclear fusion reactors, in lightweight, compact lithium/sulfur batteries for electric cars and for power plant load leveling purposes, as a degasifier in the production of high-conductivity copper and bronze, and in the synthesis of compounds for use in the field of medicine.

Lithium metal is generally produced by electrolysis of eutectic mixture of highly pure molten lithium chloride and potassium chloride.

There are naturally occurring brines in the United States which contain reasonable concentrations of lithium, in the form of the chloride, so as to be considered viable reserves for lithium recovery. Three particular sources include Searle's Lake, California, the Great Salt Lake, Utah, and Clayton Valley, Nevada. The latter is the most economical source of lithium since the magnesium to lithium ratio is low, generally about 1.15:1, which allows for a simplified process of concentrating, purifying and recovering lithium chloride brine. Lithium carbonate is then obtained by treatment of the brine with soda ash.

To make lithium metal, the lithium carbonate is converted to lithium hydroxide via a liming process, and the latter compound in turn is converted to lithium chloride by treatment with hydrochloric acid following by drying. This is a very circuitous and expensive route to lithium chloride, since lithium originally exists as the chloride in the natural brine. Thus, for many years there has been the need for a direct economical method for recovering lithium chloride as such from natural brines.

As noted, natural brine typically contains only a few hundred parts per million of lithium in conjunction with substantial quantities of sodium, potassium and magnesium chlorides and sulfates, as well as other minor contaminants such as bromides, rubidium, boron and organic compounds. In the manufacture of lithium metal by electrolysis of lithium chloride, the alkaline earth metals must first be removed from the lithium chloride, otherwise they will be present as contaminants in the lithium metal. Similarly, sodium must be removed since the presence of very small quantities thereof in the lithium metal will make it highly reactive and much different in properties than high purity lithium metal. Also, during the electrolysis of lithium chloride, non-volatile anions, such as sulfate and borate, will build up resulting in very rapid short circuiting of the cell. Since cell costs are quite high, continuous uninterrupted operation thereof for extended periods of time, e.g. six months to a year, must be realized.

It is a primary object of this invention to provide an improved process for producing lithium chloride of high purity.

Another object of this invention is to provide a novel method for treating lithium chloride to improve the filterability of solvent solutions thereof whereby the amounts of such contaminants as sodium, alkaline earth metals, boron and organics may be reduced to such levels as to render the lithium chloride suitable for use as an electrolyte in the production of high purity lithium metal.

Other objects and advantages of the present invention will become apparent from the following description of specific embodiments thereof and the appended claims.

DETAILED DESCRIPTION OF THE INVENTION

Figure 1:
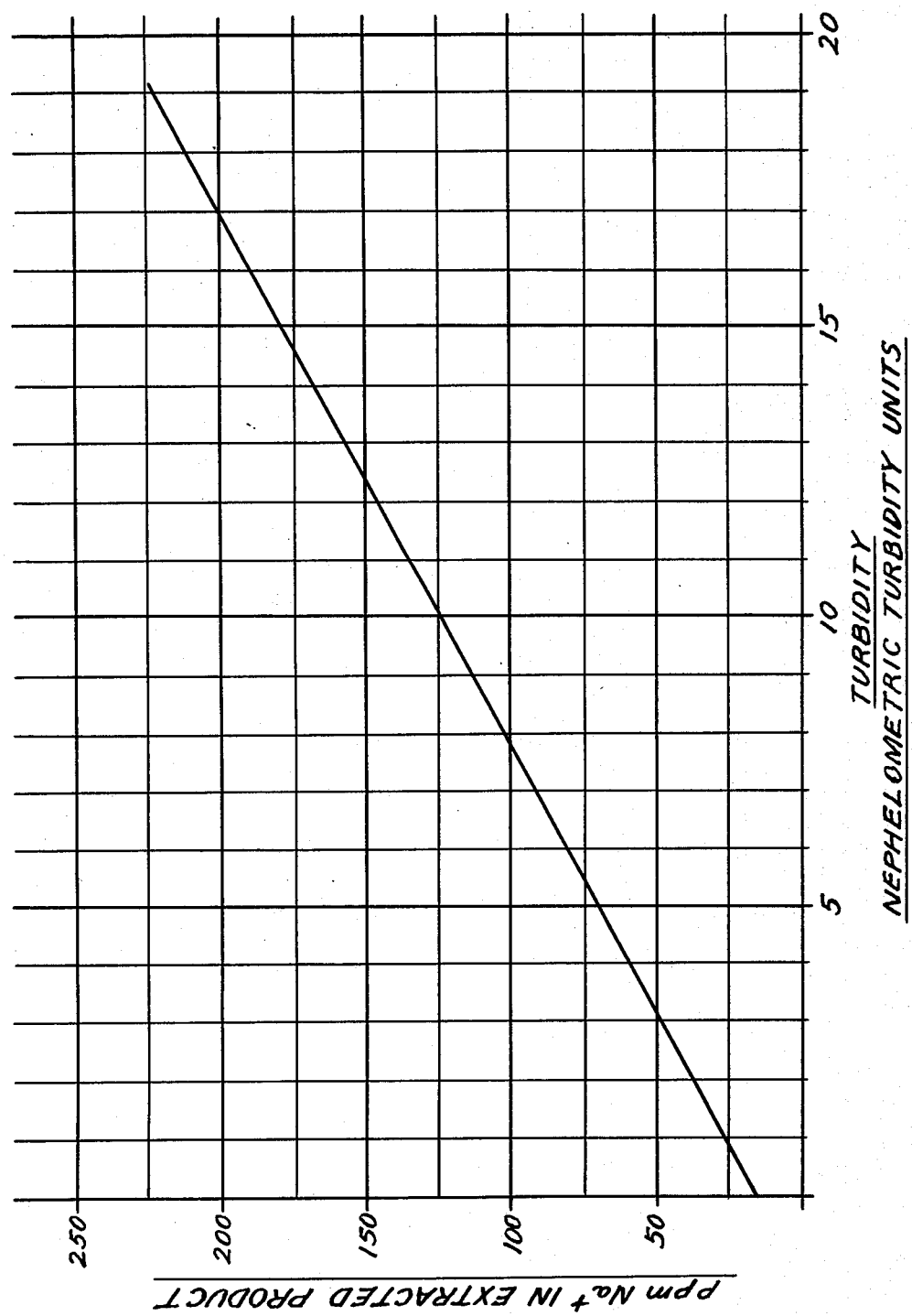

According to this invention there is provided a novel process for purifying lithium chloride containing small amounts of various impurities such as sodium, potassium, calcium, boron, sulfate and/or organics which comprises heating lithium chloride contaminated with one or more of said impurities to a temperature above about 200° C. but not substantially exceeding the melting point of lithium chloride, cooling the lithium chloride to ambient conditions, extracting the lithium chloride with isopropanol, separating the liquid phase from the solid phase, removing the isopropanol, and recovering a solid lithium chloride product of high purity.

The solid impure lithium chloride which may be treated according to this invention may be from any available source. However, for the sake of convenience of discussion, the process of this invention is described in connection with lithium chloride produced by concentrating a natural brine by means of solar evaporation.

As described hereinabove, by means of solar evaporation a brine containing about 3% lithium chloride can be obtained from a natural brine available at Clayton Valley, Nevada. Typical of the composition for a brine so concentrated is set forth in Table I, below.

TABLE I

| Constituent | Weight Percent |
|---|---|
| Li | 0.77  (4.7% LiCl) |
| Na | 6.28 |
| K | 4.70 |
| Mg | 0.0053 |
| Ca | 0.0081 |
| B | 0.26 |
| $SO_4$ | 2.90 |
| Cl | 15.95 |
| Br | 0.055 |
| $H_2O$ | 68.8 |

Such brines typically have a pH of about 9.5 and a specific gravity of about 1.25 at 23° C.

A brine of the composition of that given in Table I may be further evaporated by solar energy in a suitable pond system composed of a series of connected ponds of relatively large surface area and shallow depth. In view of the substantial economies to be effected by the use of solar energy to further concentrate the brine, such procedure preferably is carried out until a brine containing in excess of 40% lithium chloride is obtained. Such solar evaporation procedure is described in detail in copending application Ser. No. 028,976 filed Apr. 11, 1979.

Briefly, the process of such copending application comprises providing a pond system consisting of a series of shallow ponds of relatively large surface area, and flowing a dilute lithium chloride brine, that of Table I being typical, into one end of the pond system. The rate of flow of the lithium chloride brine through the pond system is regulated so that through evaporation by means of solar energy, the concentration of the brine, at a point intermediate the points of introduction to and removal of the brine from the pond system, is increased to provide a brine whose concentration has a vapor pressure substantially in equilibrium with the partial pressure of moisture in the atmosphere at the geographic location of the pond system. The continued flow of the more concentrated brine through the remainder of the pond system is further regulated so that through solar energy the temperature of the brine during at least a substantial portion of the daylight hours exceeds that of the air immediately above the pond system. In this way the vapor pressure of the brine exceeds the partial pressure of moisture in the atmosphere above the pond system and additional water is evaporated to increase the concentration of lithium chloride in the brine to 40% or more. A brine saturated with respect to lithium chloride can be obtained in this manner if so desired.

After the brine has been concentrated to the desired degree by solar evaporation, it is subjected to a liquid-solids separation step, e.g. centrifugation or filtration, and the liquid phase is then subjected to evaporation, preferably under vacuum to obtain solid lithium chloride which is dried. Drying temperatures in excess of 101° C., and preferably on the order of about 110° C. should be used in order to obtain anhydrous lithium chloride, rather than the monohydrate.

Of course, the brine can be concentrated using any suitable energy source, e.g. fossil fuels, natural gas, etc., but the economic benefits to be derived from the use of solar energy are obvious.

In the case of dilute lithium chloride brines having a composition similar to the brine of Table I, i.e. a brine containing small amounts of alkaline earth metals, borate and sulfate, it may be desirable to subject the brine to a chemical treatment or treatments prior to concentration of the brine. A particularly advantageous process for such purpose is described and claimed in copending application Ser. No. 028,975 filed Apr. 11, 1979. According to the process of that application, calcium chloride and slaked lime are added to the dilute brine containing about 3% lithium chloride before further solar evaporation for removal of sulfate, magnesium, and boron impurities.

As indicated above, the solid lithium chloride recovered from the concentrated brine should be dried at temperatures sufficiently high to produce anhydrous lithium chloride, as compared to the monohydrate. According to the process of the present invention the solid lithium chloride should be heated to a temperature of at least 200° C., but generally a temperature not substantially exceeding the melting point of the compound which is abaout 613° C. According to a preferred procedure, the brine which has been concentrated by solar evaporation is subjected to evaporation at a temperature above about 101° C., by application of heat, preferably under vacuum to generate a slurry containing on the order of 35% by weight of solids. The solids may then be separated from the liquid phase by filtration or centrifugation while the temperature of the slurry in maintained in excess of about 101° C. The solids may then be introduced to a suitable drier, e.g. of the rotary type, where they are heated at a temperature in excess of 200° C., and preferably between about 270° and 325° C. for a period sufficient to reduce the moisture content to less than about 0.5%.

The heating of the lithium chloride to temperatures above about 200° C. produces certain beneficial results. Organic contaminants are vaporized, pyrolyzed or at least rendered insoluble in isopropanol, the selective solvent for lithium chloride used in the present process, and thereby are removed. In addition, borates present, which also are soluble in isopropanol, are converted to boron oxide which is insoluble in this solvent and thus the possibility of the lithium chloride being contaminated with amounts of boron unacceptable for many purposes is greatly decreased.

The lithium chloride is subsequently cooled to ambient temperatures and extracted with isopropanol. The amount of isopropanol used should be such that the weight ratio of isopropanol to salt to be extracted is from about 5:1 to about 10:1, a weight ratio of about 7:1 being preferred.

The extraction step may be carried out under ambient temperature conditions; however, temperatures in the order of 20° C. up to 83° C., the boiling point of isopropanol, may be used. Employing extraction temperatures of 83° C. or more would, of course, result in loss of solvent through volatilization.

The extraction time may vary considerably, e.g. from 1 to 24 hours, depending upon the size of the lithium chloride (salt) particles, agitation rate and solvent temperature. Generally good results can be obtained by slurrying the salt in the isopropanol with good agitation for a period of about 3 hours.

The isopropanol-salt slurry is next subjected to a liquid-solids separation, as for example by filtration. The filterability of the slurry and rate of separation of solids from the liquid are dependent upon drying temperatures of lithium chloride as described hereinabove and in certain of the subsequent examples.

The degree of separation, i.e. the removal of solids from the liquid phase is dependent upon the desired utility for the lithium chloride produced.

In obtaining a lithium chloride product of low sodium and boron content for use as an electrolyte for the production of high purity lithium metal, it is desirable that the filtrate have a Nephlometric Turbidity of less than about 3. This will insure that the sodium level is less than about 50 ppm. Such result can be accomplished by filtering the liquid phase several times through suitable filter media. For example, the liquid phase can be twice filtered through a D porosity filter, the second filtration being carried out through the wet filter cake of the primary filtration. Even lower levels of sodium can be obtained by use of very fine, such as 0.45 µm millipore, filters.

FIG. 1 hereto is a plot of sodium in parts per million in the lithium chloride product versus turbidity, measured in Nephlometric Turbidity Units. The data used to plot the graph of FIG. 1 was obtained using a Fisher DRT-100 Turbidimeter. As can be seen by reference to FIG. 1, to obtain a lithium chloride product containing less than 50 ppm sodium, the turbidity should not substantially exceed about 3.

Following the liquid-solids separation step, the isopropanol is removed, preferably by heating the solution of lithium chloride in isopropanol under atmospheric pressure and at moderate temperatures, e.g. about 90° C., followed by removing any remaining solvent under vacuum at reduced temperatures to prevent overheating of the product and solvent degredation. The isopropanol can be recovered and recycled to the solvent extraction step, and dry lithium chloride of high purity recovered.

The anhydrous lithium chloride obtained as herein described finds particular use as an electrolyte in the production of lithium metal whose various uses have been described above.

The following non-limiting examples are given by way of explanation.

EXAMPLE 1

A naturally occurring brine was pumped from the ground at Clayton Valley, Nev., and evaporated by means of solar energy to 1500 ppm lithium according to the commercial process of Foote Mineral Company previously described. The brine was then limed for magnesium removal and further concentrated by solar energy to about 0.6% lithium (about 3.6% lithium chloride).

Approximately 1,457 gallons (14,563 pounds) of this more concentrated brine was treated with 0.058 pounds of lime and 0.812 pounds of calcium chloride per pound of lithium chloride in the brine according to the process of copending application Ser. No. 028,975 filed Apr. 11, 1979. The resultant slurry was allowed to settle, and the solids-free liquid was decanted to produce a brine yield of about 92.4%.

11,984 Pounds of the purified brine were placed in two evaporating pans and were evaporated by means of solar energy in a series of four steps. After standing for a period of time, a portion of the brine precipitated as calcium borate hydrate. The composition of the purified brine prior to, during and at the conclusion of the last described solar evaporation is set forth in Table II below.

TABLE II
ANALYTICAL RESULTS OF BRINE COMPOSITIONS FROM SOLAR EVAPORATION

Weight % (Except as Noted)

| | Li | Mg | Na | Ca | K | SO$_4$ | B | Cl | K.F. H$_2$O | Al | LiOH | Li$_2$CO$_3$ |
|---|---|---|---|---|---|---|---|---|---|---|---|---|
| Original Brine | 0.449 | <1 ppm | 5.86 | 0.23 | 3.75 | 0.56 | — | 14.5 | 73.78 | | | |
| 1st Evaporation | 0.850 | <5 ppm | 6.00 | 0.067 | 4.72 | 0.54 | 0.10 | 17.83 | 69.9 | | | |
| 2nd Evaporation | 1.37 | <5 ppm | 5.03 | 0.042 | 4.36 | 0.83 | 0.16 | 17.94 | 70.5 | | | |
| 3rd Evaporation | 3.17 | <5 ppm | 1.69 | 0.047 | 2.70 | 0.97 | 0.33 | 20.24 | 70.5 | | | |
| Final Brine* | 4.09 | <1 ppm | 0.75 | 0.038 | 1.15 | 0.67 | 0.33 | 23.26 | 74.28 | 30 ppm | 0.70 | 0.16 |

*11.6 lbs. CaCl$_2$ and 12.5 gallons H$_2$O slurry added to 7' pan in 4th doubling to remove sulfate buildup.

The final brine of Table II was further evaporated to approximately 43.4% lithium chloride, with a yield of 96.6% in the brine phase. The analyses of the brine and solids are set forth in Table III.

TABLE III

| | Weight Percent or PPM | |
|---|---|---|
| Component | Brine | Salts |
| Li | 7.12 | 0.689 |
| Na | 0.082 | 27.66 |
| K | 1.77 | 8.86 |
| Ca | 41 ppm | 35 ppm |
| Mg | 1 ppm | 8 ppm |
| B | 0.21% | 197 ppm |
| Si | 55 ppm | 91 ppm |
| Fe | 24 ppm | 150 ppm |
| SO$_4$ | 0.12% | 9 ppm |
| H$_2$O | — | 7.46 |

The concentrated brine of Table III was evaporated under vacuum and dried at approximately 110° C.

A total of 52.3 grams of the dried crude lithium chloride were extracted with 475 milliliters of isopropanol by stirring for a period of 19 hours. The resulting solution of lithium chloride in isopropanol was filtered and the filtrate evaporated to dryness. The resultant lithium chloride product weighed 42.6 grams and had the following analysis:

TABLE IV

| Constituent | Weight Percent or PPM |
|---|---|
| Li | 16.24 |
| Na | 0.0022 |
| K | 0.0060 |
| Fe$_2$O$_3$ | 0.002 |
| Cl | 82.94 |
| B | 0.0015 |
| H$_2$O | 0.094 |
| Li$_2$CO$_3$ | 0.07 |
| BaCl$_2$ | 3 ppm |
| CaCl$_2$ | 0.0055 |
| SO$_4$ | 0.015 |

As can be seen by reference to Table IV, the lithium chloride product so generated was relatively pure.

EXAMPLE 2

The procedure of Example 1 was repeated with the exception that 36.9 grams of the impure lithium chloride, prior to extraction with isopropanol, were heated to 270° C. and then extracted, i.e. slurred with 269.4 grams of isopropanol over a period of 24 hours. The slurry was then filtered through a D porosity fritted filter and then through a 0.45 micrometer millipore filter. The solvent was evaporated off resulting in a lithium chloride product having the following analysis.

TABLE V

| Constituent | Weight % |
|---|---|
| Li | 15.56 |
| Na | 0.0024 |
| K | 0.0036 |
| Cl | 82.90 |
| SO$_4$ | 0.0014 |
| Ca | 0.0021 |
| B | 0.0007 |

By reference to Table V it can be seen that the boron concentration is extremely low (7 ppm) which is about one-half as great as that of the product of Example 1 in which the crude lithium chloride was dried at 110° C. prior to extraction with isopropanol. Also, the product of Example 2 was essentially free of organic matter.

EXAMPLE 3

A series of extractions were carried out to study the relationship between solvent to crude salt ratio. Ratios of 10.0/1 to 5.5 to 1 were investigated using crude salt containing 90% LiCl. The crude salt was dried at 270° C. for 24 hours, crushed, then dried for an additional 24 hours. The salts were extracted for 24 hours with paddle agitation, pressure filtered through a D porosity frit and polished filtered through 00.45 μm Milipore. The solvent (isopropanol) was removed and its products dried. The major impurities in the solid products for the various solvent/salt ratios are given in Table VI.

TABLE VI

Major Impurities in Solid Products from Various Solvent/Salt Ratios

| Run | Ratio | ppm Na | ppm K | ppm Ca | ppm SO$_4$ | ppm B | % H$_2$O |
|---|---|---|---|---|---|---|---|
| 1 | 10.0/1 | 43 | 45 | 28 | 11 | 2 | 0.3 |
| 2 | 7.3/1 | 24 | 36 | 21 | 14 | 7 | 0.1 |
| 3 | 6.4/1 | 18 | 47 | 19 | 11 | — | 0.1 |
| 4 | 5.5/1 | 21 | 35 | 17 | 11 | 4 | 0.2 |
| 5 | 5.0/1 | 19 | 36 | — | — | — | 0.1 |

EXAMPLE 4

This example shows the effect of the temperatures used in drying the lithium chloride on the filtration rate of an isopropanol extract of the crude salt.

Crude salt which was white in color was obtained by drying the salt from the concentrate at 110° C. under vacuum until the moisture content of the salt was about 0.5%. The dried salt was then ground in a jaw crusher.

Samples of the ground salt were further dried at various temperatures for 30 minutes using a muffle oven. In each instance the heat up time was 5 minutes, and the dried product showed signs of charring. The samples were cooled and then extracted with 7.3 pounds of isopropanol per pound of salt. The extraction time in each instance was 24 hours.

The resulting slurries of salt in isopropanol were filtered through a D porosity frit having a precoat of K700 filter aid under 15″ Hg pressure.

Table VII summarizes filtration rate as a function of drying temperatures.

TABLE VII

| Drying Temp. °C.* | Filtration Rate | |
|---|---|---|
|  | 1st Pass - g. slurry/min. | 2nd Pass - g. slurry/min. |
| 240 | 2.69 | 2.10 |
| 280 | 3.33 | 3.05 |
| 300 | 4.86 | 4.25 |
| 325 | 13.54 | 10.08 |

*30 min. drying time

In previous experiments where the crude salt was dried at 110° C., filtration rates were tediously slow, being considerably slower than for salt dried at 270° C.

As shown by Table VII, the high temperature drying according to this invention provides the benefit of increasing the rate of filtration of the isopropanol extract.

Figure 2:
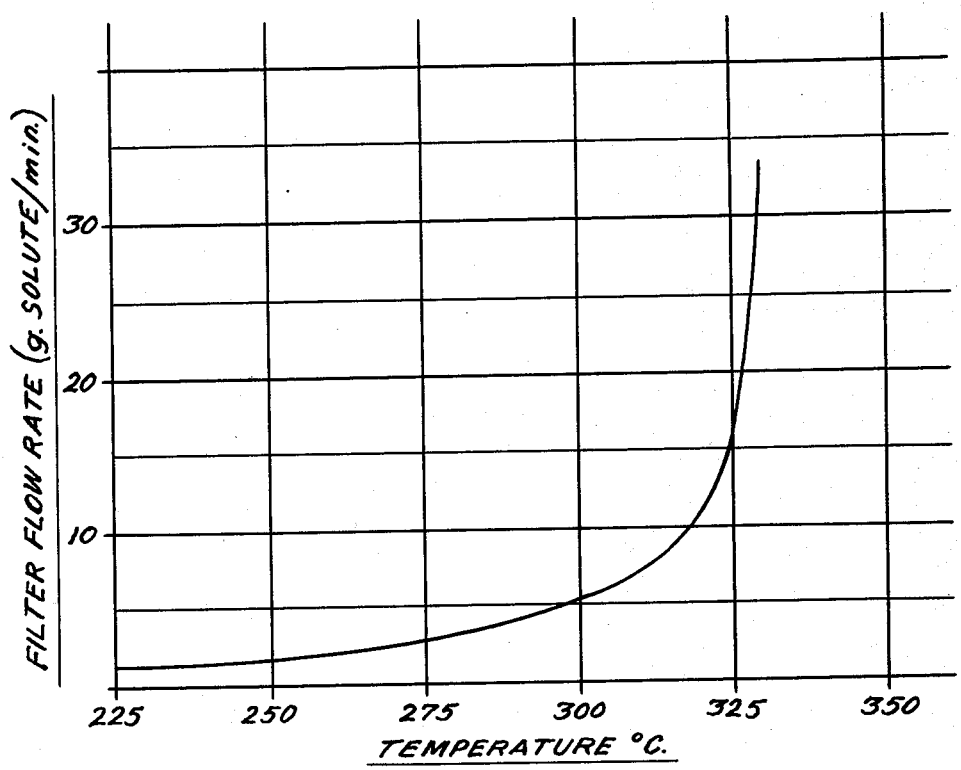

FIG. 2 hereto is a plot of filtration rate of the isopropanol extract as a function of drying temperatures, and shows that for crude lithium chloride salt dried at temperatures above about 300° C., the filtration rate increases rapidly, particularly when drying temperatures on the order of 325° C. are used.

Differential thermal analysis performed on the crude salt revealed an exotherm at 354° C. which has been assigned to the lithium chloride/potassium chloride eutectic melting point. The elimination of fine particles of potassium chloride by heating to elevated temperatures is believed to account for the increased filtering rates.

It is claimed:

1. A process for purifying lithium chloride containing small amounts of impurities such as sodium, potassium, calcium, boron, sulfate and/or organic compounds which comprises heating lithium chloride contaminated with one or more of said impurities to a temperature in the range of from about 270° to about 325° C., cooling said lithium chloride to ambient conditions, extracting said lithium chloride with isopropanol, separating the liquid phase from the solid phase, removing said isopropanol from said liquid phase, and recovering a solid lithium chloride product of high purity.

2. The process according to claim 1 in which said lithium chloride is extracted with from about 5 to about 10 parts by weight of isopropanol per part by weight of lithium chloride.

3. The process according to claim 1 in which the isopropanol containing dissolved lithium chloride is passed through a very fine filter to provide a filtrate having a turbidity of less than about 3.

* * * * *